(12) United States Patent
Wan (10) Patent No.: US 11,212,070 B2
(45) Date of Patent: Dec. 28, 2021

(54) CLOCK PHASE RECOVERY APPARATUS AND METHOD, AND CHIP

(71) Applicant: Huawei Technologies Co., Ltd., Shenzhen (CN)

(72) Inventor: Wentong Wan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/062,210

(22) Filed: Oct. 2, 2020

(65) Prior Publication Data

US 2021/0028920 A1 Jan. 28, 2021

Related U.S. Application Data

(63) Continuation of application No. PCT/CN2019/078028, filed on Mar. 13, 2019.

(30) Foreign Application Priority Data

Apr. 2, 2018 (CN) .......................... 201810284900.1

(51) Int. Cl.
*H04L 7/00* (2006.01)
*H04B 7/0413* (2017.01)
(Continued)

(52) U.S. Cl.
CPC ......... *H04L 7/0079* (2013.01); *H04B 7/0413* (2013.01); *H04B 10/2569* (2013.01); *H04B 10/60* (2013.01)

(58) Field of Classification Search
CPC ... H04L 7/0079; H04L 7/0413; H04B 7/0413; H04B 10/2569; H04B 10/60
See application file for complete search history.

(56) References Cited

U.S. PATENT DOCUMENTS 7,627,252 B2 * 12/2009 Sun .......................... H03L 7/085
398/147
8,712,247 B2 * 4/2014 Hauske .................. H04L 7/027
398/155
(Continued)

FOREIGN PATENT DOCUMENTS

CN 102612811 A 7/2012
CN 103713194 A 4/2014
(Continued)

OTHER PUBLICATIONS

CN/201810284900.1, Office Action/Search Report, dated May 27, 2021.
(Continued)

*Primary Examiner* — James M Perez
(74) *Attorney, Agent, or Firm* — Leydig, Voit & Mayer, Ltd.

(57) ABSTRACT

Embodiments of this application provide a clock phase recovery apparatus and method, and a chip. The clock phase recovery apparatus includes an ADC, a dispersion compensation unit, a digital interpolator, a MIMO equalization unit, and a clock offset phase obtaining unit. The ADC is connected to the dispersion compensation unit, and the dispersion compensation unit is connected to a first input end of the digital interpolator. An output end of the digital interpolator is connected to an input end of the MIMO equalization unit, and an output end of the MIMO equalization unit is connected to an input end of the clock offset phase obtaining unit. The digital interpolator is configured to adjust, based on first offset phase information output by the clock offset phase obtaining unit, a dispersion-compensated signal output by the dispersion compensation unit.

12 Claims, 5 Drawing Sheets

(51) Int. Cl.
    *H04B 10/2569*     (2013.01)
    *H04B 10/60*     (2013.01)

(56) References Cited

U.S. PATENT DOCUMENTS

| | | | | |
|---|---|---|---|---|
| 8,909,068 | B2* | 12/2014 | Stojanovic | H04B 10/6165 398/208 |
| 9,065,590 | B2* | 6/2015 | Bianciotto | H04L 7/0075 |
| 9,264,214 | B2* | 2/2016 | Yan | H04L 7/0075 |
| 9,379,820 | B2* | 6/2016 | Huang | H04L 27/2657 |
| 9,467,246 | B2* | 10/2016 | Bianciotto | H04B 10/6165 |
| 9,503,284 | B2* | 11/2016 | Nazarathy | H04L 27/264 |
| 9,602,151 | B1* | 3/2017 | Zamani | H04B 1/40 |
| 9,628,219 | B2* | 4/2017 | Aharony | H04B 7/0632 |
| 9,673,910 | B1* | 6/2017 | Crivelli | H04B 10/6162 |
| 9,838,140 | B1* | 12/2017 | Crivelli | H04B 10/40 |
| 9,871,615 | B2* | 1/2018 | Bianciotto | H04L 7/0079 |
| 9,906,307 | B2* | 2/2018 | Stojanovic | H04B 10/6161 |
| 9,998,274 | B2* | 6/2018 | Zamani | H04B 10/6161 |
| 10,038,506 | B2* | 7/2018 | Crivelli | H04B 10/6161 |
| 10,135,543 | B2* | 11/2018 | Yao | H04L 7/0075 |
| 10,264,540 | B2* | 4/2019 | Yu | H04L 7/04 |
| 10,505,768 | B2* | 12/2019 | Abughalieh | H04L 25/03019 |
| 11,012,267 | B2* | 5/2021 | Huang | H04B 7/0695 |
| 2007/0009074 | A1* | 1/2007 | Ma | G11B 20/18 375/371 |
| 2012/0177156 | A1* | 7/2012 | Hauske | H04L 7/027 375/343 |
| 2012/0308234 | A1* | 12/2012 | Bianciotto | H04B 10/6165 398/65 |
| 2013/0039665 | A1* | 2/2013 | Hauske | H04L 7/027 398/202 |
| 2013/0209098 | A1* | 8/2013 | Huang | H04B 10/60 398/43 |
| 2014/0105616 | A1* | 4/2014 | Yan | H04L 7/0029 398/208 |
| 2014/0307769 | A1* | 10/2014 | He | H04L 25/03949 375/233 |
| 2015/0280857 | A1* | 10/2015 | Bianciotto | H04B 10/614 398/65 |
| 2016/0329970 | A1* | 11/2016 | Yao | H04B 10/6162 |
| 2017/0019206 | A1* | 1/2017 | Bianciotto | H04L 7/0079 |
| 2017/0033890 | A1* | 2/2017 | Aharony | H04B 7/0469 |
| 2017/0063408 | A1* | 3/2017 | Zamani | H04B 1/40 |
| 2017/0141943 | A1* | 5/2017 | Nazarathy | H04L 1/0071 |
| 2017/0373827 | A1* | 12/2017 | Azenkot | H04L 25/0224 |
| 2018/0062760 | A1* | 3/2018 | Crivelli | H04B 10/2569 |
| 2018/0159652 | A1* | 6/2018 | Calabro | H04B 10/6165 |
| 2019/0182082 | A1* | 6/2019 | Abughalieh | H04B 10/6164 |
| 2021/0028920 | A1* | 1/2021 | Wan | H04B 10/60 |

FOREIGN PATENT DOCUMENTS

| | | |
|---|---|---|
| CN | 104780037 A | 7/2015 |
| CN | 107113159 A | 8/2017 |
| WO | 2016106548 A1 | 7/2016 |

OTHER PUBLICATIONS

Portela et al., "Novel Non-Data-Aided Clock Recovery Method for DP-QPSK Systems With CMA Equalizers," IEEE Photonics Technology Letters, vol. 24, No. 19, pp. 1696-1699, Institute of Electrical and Electronics Engineers, New York, New York (Oct. 1, 2012).

Faruk et al., "Digital Signal Processing for Coherent Transceivers Employing Multilevel Formats," Journal of Lightwave Technology, vol. 35, No. 5, pp. 1125-1141, Institute of Electrical and Electronics Engineers, New York, New York (Mar. 1, 2017).

Sun et al.,"A Novel Dispersion and PMD Tolerant Clock Phase Detector for Coherent Transmission Systems," OSA/OFC/NFOEC 2011, total 3 pages (Date Added to IEEE Xplore: Jun. 13, 2011).

Stojanovic et al., "Clock Recovery in Coherent Optical Receivers," Photonische Netze, May 2-3, 2011 in Leipzig, total 4 pages (2011).

Sun, "Clock and Carrier Recovery for Coherent Receivers," Ecoc 2015-ID: 0593, total 3 pages (2015).

Dorize et al., "Performance Analysis of Nonlinear and Gardner Timing Error Detectors with Frequency Selective Pulse Shaping," Ecoc 2015-ID: 0072, total 3 pages (2015).

\* cited by examiner

CLOCK PHASE RECOVERY APPARATUS AND METHOD, AND CHIP

CROSS-REFERENCE TO RELATED APPLICATIONS

This application is a continuation of International Application No. PCT/CN2019/078028, filed on Mar. 13, 2019, which claims priority to Chinese Patent Application No. 201810284900.1, filed on Apr. 2, 2018. The disclosures of the aforementioned applications are hereby incorporated by reference in their entireties.

TECHNICAL FIELD

Embodiments of this application relate to the communications technologies field, and in particular, to a clock phase recovery apparatus and method, and a chip.

BACKGROUND

In an optical communications system, after optical-to-electrical conversion is performed at a receive end, algorithmic processing in a digital domain needs to be performed. A rate at which the algorithm processing is performed at the receive end needs to keep synchronous with a rate at which a transmit end sends data, to ensure that all transmitted data is processed in time. In other words, the transmit end and receive end need to ensure clock synchronization. If a synchronization deviation occurs between a clock of the transmit end and a clock of the receive end, the clocks need to be recovered to ensure that sampled data at the receive end is exactly at an optimal decision point of a signal element, to implement data synchronization between the receive end and the transmit end. It can be learned that clock recovery is an integral part of a communications system, and performance of the clock recovery directly affects system performance.

Currently, a clock phase recovery apparatus may be implemented in an analog circuit, or may be implemented in a digital circuit. When the clock phase recovery apparatus is implemented by using the digital circuit, the clock phase recovery apparatus usually includes an analog-to-digital converter (ADC), a dispersion compensation unit, a polarization state compensation circuit, a clock phase extraction unit, a loop filter, and a voltage-controlled oscillator (VCO). The clock phase extraction unit completes calculation of an element phase error, and a calculated error signal may be fed back to the VCO through the loop filter. The VCO adjusts a clock phase to obtain a data element with an optimal sampling phase.

However, in an entire loop, there are many modules for A/D conversion, clock phase extraction, loop filtering, and VCO control, resulting in a high clock recovery delay. This affects the system performance.

SUMMARY

Embodiments of this application provide a clock phase recovery apparatus and method, and a chip, to reduce a clock phase delay and improve system performance.

According to a first aspect, an embodiment of this application provides a clock phase recovery apparatus, including an ADC, a dispersion compensation unit, a digital interpolator, a MIMO equalization unit, and a clock offset phase obtaining unit. An output end of the ADC is connected to an input end of the dispersion compensation unit, and an output end of the dispersion compensation unit is connected to a first input end of the digital interpolator. An output end of the digital interpolator is connected to an input end of the MIMO equalization unit, and an output end of the MIMO equalization unit is connected to an input end of the clock offset phase obtaining unit. An output end of the clock offset phase obtaining unit is connected to a second input end of the digital interpolator. The ADC is configured to perform analog-to-digital conversion on an input analog signal, and output a second sampling signal. The dispersion compensation unit is configured to perform dispersion compensation on the second sampling signal output by the ADC, and output a dispersion-compensated signal to the digital interpolator. The digital interpolator is configured to adjust, based on first offset phase information output by the clock offset phase obtaining unit, the dispersion-compensated signal output by the dispersion compensation unit, so that a signal output by the digital interpolator is a signal at an optimal sampling moment. The first offset phase information is determined by the clock offset phase obtaining unit based on a tap coefficient of the MIMO equalization unit and a first output signal output by the MIMO equalization unit. The first output signal is an output signal corresponding to a first sampling signal, and the first sampling signal is a previous adjacent sampling signal of the second sampling signal. The MIMO equalization unit is configured to perform polarization mode dispersion compensation and equalization on the signal output by the digital interpolator, and output a second output signal.

According to the clock phase recovery apparatus provided in the first aspect, the digital interpolator is disposed between the dispersion compensation unit and the MIMO equalization unit. The digital interpolator, the MIMO equalization unit, and the clock offset phase obtaining unit form a feedback loop to complete a clock phase adjustment. There is a small quantity of modules in the feedback loop, and in particular, the dispersion compensation unit is not included. Therefore, a delay caused by FFT and IFFT calculation is avoided, and a loop delay is reduced. This reduces a clock phase delay and improves system performance. In addition, because an adjustment speed of the digital interpolator is relatively fast, the clock phase delay is further reduced.

Optionally, in a possible implementation of the first aspect, the clock offset phase obtaining unit includes a decoupling module, a clock phase detector, an adder, and a filter. A first output end of the MIMO equalization unit is connected to an input end of the decoupling module, and a second output end of the MIMO equalization unit is connected to an input end of the clock phase detector. The output end of the MIMO equalization unit and an output end of the clock phase detector are separately connected to an input end of the adder. An output end of the adder is connected to an input end of the filter, and an output end of the filter is connected to the second input end of the digital interpolator. The decoupling module is configured to determine a compensated clock phase based on the tap coefficient of the MIMO equalization unit, and output the compensated clock phase to the adder. The clock phase detector is configured to obtain a clock phase of the first output signal output by the MIMO equalization unit, and output the clock phase of the first output signal to the adder. The adder is configured to obtain a clock offset phase based on the compensated clock phase output by the decoupling module and the clock phase that is of the first output signal and that is output by the clock phase detector, and output the clock offset phase to the filter. The filter is configured to perform high frequency filtering on the clock offset phase output by the adder to obtain the first offset phase information, and output the first offset phase information to the digital interpolator.

Optionally, in a possible implementation of the first aspect, the decoupling module is specifically configured to determine the compensated clock phase a according to a=angle (Wxx*Wyy−Wyx*Wxy). Wxx, Wyy, Wyx, and Wxy are tap coefficients of the MIMO equalization unit, and angle ( ) represents a phase function.

Optionally, in a possible implementation of the first aspect, the clock phase detector is a phase detector.

Optionally, in a possible implementation of the first aspect, the apparatus further includes a carrier recovery unit. An input end of the carrier recovery unit is connected to the output end of the MIMO equalization unit. The carrier recovery unit is configured to perform carrier recovery on the second output signal output by the MIMO equalization unit, and output a carrier-recovered signal.

Optionally, in a possible implementation of the first aspect, the apparatus further includes a voltage-controlled oscillator VCO and a loop filter. The output end of the clock offset phase obtaining unit is further connected to an input end of the loop filter, an output end of the loop filter is connected to an input end of the VCO, and an output end of the VCO is connected to the ADC. The loop filter is configured to perform loop low-pass filtering on the first offset phase information output by the clock offset phase obtaining unit to convert the first offset phase information into a voltage control signal. The VCO is configured to determine a clock adjustment signal based on the voltage control signal output by the loop filter.

Optionally, in a possible implementation of the first aspect, the ADC is specifically configured to adjust sampling frequency based on the clock adjustment signal output by the VCO, and perform the analog-to-digital conversion on the analog signal based on adjusted sampling frequency to obtain the second sampling signal.

According to a second aspect, an embodiment of this application provides a clock phase recovery method, applied to a clock phase recovery apparatus. The clock phase recovery apparatus includes an analog-to-digital converter ADC, a dispersion compensation unit, a digital interpolator, a multiple-input multiple-output MIMO equalization unit, and a clock offset phase obtaining unit. An output end of the ADC is connected to an input end of the dispersion compensation unit, and an output end of the dispersion compensation unit is connected to a first input end of the digital interpolator. An output end of the digital interpolator is connected to an input end of the MIMO equalization unit, and an output end of the MIMO equalization unit is connected to an input end of the clock offset phase obtaining unit. An output end of the clock offset phase obtaining unit is connected to a second input end of the digital interpolator. The method includes: receiving, by the ADC, an analog signal, and performing analog-to-digital conversion on the analog signal to obtain a second sampling signal; performing, by the dispersion compensation unit, dispersion compensation on the second sampling signal to obtain a dispersion-compensated signal; adjusting, by the digital interpolator, the dispersion-compensated signal based on first offset phase information, so that an adjusted signal is a signal at an optimal sampling moment, where the first offset phase information is determined by the clock offset phase obtaining unit based on a tap coefficient of the MIMO equalization unit and a first output signal, the first output signal is an output signal corresponding to a first sampling signal, and the first sampling signal is a previous adjacent sampling signal of the second sampling signal; and performing, by the MIMO equalization unit, polarization mode dispersion compensation and equalization on the adjusted signal to obtain a second output signal.

Optionally, in a possible implementation of the second aspect, the clock offset phase obtaining unit includes a decoupling module, a clock phase detector, an adder, and a filter. A first output end of the MIMO equalization unit is connected to an input end of the decoupling module, and a second output end of the MIMO equalization unit is connected to an input end of the clock phase detector. The output end of the MIMO equalization unit and an output end of the clock phase detector are separately connected to an input end of the adder. An output end of the adder is connected to an input end of the filter, and an output end of the filter is connected to the second input end of the digital interpolator. That the clock offset phase obtaining unit determines the first offset phase information based on the tap coefficient of the MIMO equalization unit and the first output signal includes: determining, by the decoupling module, a compensated clock phase based on the tap coefficient of the MIMO equalization unit; obtaining, by the clock phase detector, a clock phase of the first output signal; obtaining, by the adder, a clock offset phase based on the compensated clock phase and the clock phase of the first output signal; and performing, by the filter, high frequency filtering on the clock offset phase to obtain the first offset phase information.

Optionally, in a possible implementation of the second aspect, the determining, by the decoupling module, a compensated clock phase based on the tap coefficient of the MIMO equalization unit includes: determining, by the decoupling module, the compensated clock phase a according to a=angle (Wxx*Wyy−Wyx*Wxy), where Wxx, Wyy, Wyx, and Wxy are tap coefficients of the MIMO equalization unit, and angle ( ) represents a phase function.

Optionally, in a possible implementation of the second aspect, the clock phase recovery apparatus further includes a carrier recovery unit, and an input end of the carrier recovery unit is connected to the output end of the MIMO equalization unit. The method further includes: performing, by the carrier recovery unit, carrier recovery on the second output signal to obtain a carrier-recovered signal.

Optionally, in a possible implementation of the second aspect, the clock phase recovery apparatus further includes a voltage-controlled oscillator VCO and a loop filter. The output end of the clock offset phase obtaining unit is further connected to an input end of the loop filter, an output end of the loop filter is connected to an input end of the VCO, and an output end of the VCO is connected to the ADC. The method further includes: performing, by the loop filter, loop low-pass filtering on the first offset phase information to convert the first offset phase information into a voltage control signal; and determining, by the VCO, a clock adjustment signal based on the voltage control signal.

Optionally, in a possible implementation of the second aspect, the performing, by the ADC, analog-to-digital conversion on the analog signal to obtain a second sampling signal includes: adjusting, by the ADC, sampling frequency based on the clock adjustment signal; and performing, by the ADC, the analog-to-digital conversion on the analog signal based on adjusted sampling frequency to obtain the second sampling signal.

According to a third aspect, an embodiment of this application provides a chip, including the clock phase recovery apparatus according to any implementation of the first aspect of this application.

Embodiments of this application provide the clock phase recovery apparatus and method, and the chip. The clock phase recovery apparatus includes the ADC, the dispersion compensation unit, the digital interpolator, the MIMO equalization unit, and the clock offset phase obtaining unit. The digital interpolator, the MIMO equalization unit, and the clock offset phase obtaining unit form the feedback loop to complete the clock phase adjustment. There is a small quantity of modules in the feedback loop, and the loop delay is reduced. Therefore, this reduces the clock phase delay and improves the system performance.

DESCRIPTION OF EMBODIMENTS

Figure 1:
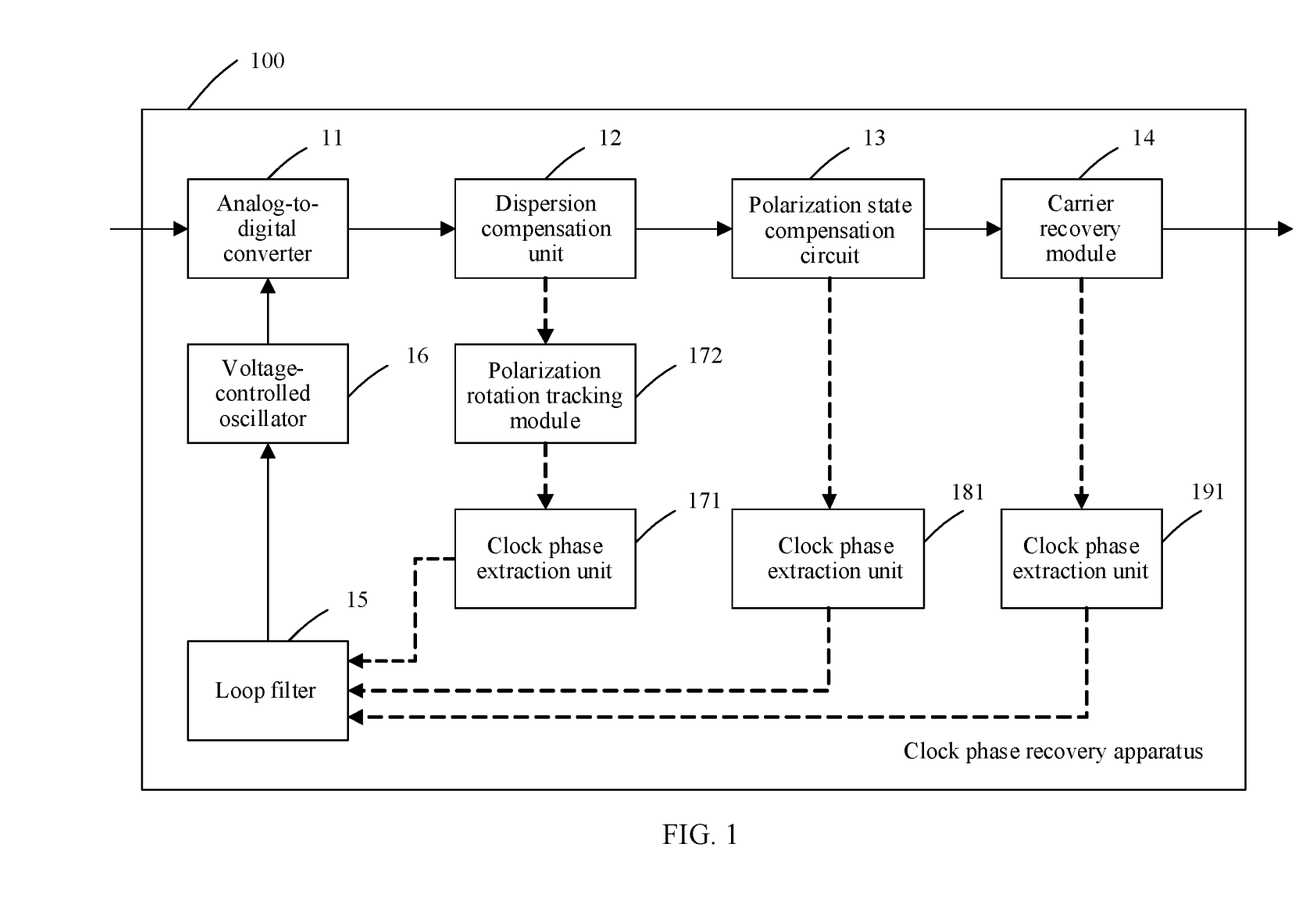
FIG. 1 is a schematic structural diagram of an existing clock phase recovery apparatus.

FIG. 1 is a schematic structural diagram of an existing clock phase recovery apparatus. As shown in FIG. 1, a clock phase recovery apparatus 100 may include an analog-to-digital converter 11, a dispersion compensation unit 12, a polarization state compensation circuit 13, a clock phase extraction unit, a loop filter 15, a voltage-controlled oscillator 16, and a carrier recovery module 14.

The analog-to-digital converter 11 is configured to perform analog-to-digital conversion on an input analog signal, and then output a digital signal. The digital signal enters the polarization state compensation circuit 13 after passing through the dispersion compensation unit 12. The dispersion compensation unit 12 performs dispersion compensation. The dispersion compensation unit 12 usually includes two important modules: a fast Fourier transformation (FFT) module and an inverse fast Fourier transformation (IFFT) module. The polarization state compensation circuit 13 performs polarization mode dispersion (PMD) compensation. After signal impairment compensation is performed on the digital signal, the digital signal enters the carrier recovery module 14, so that carrier recovery is performed on the digital signal. The clock phase extraction unit completes calculation of an element phase error, and a calculated error signal may be fed back to the voltage-controlled oscillator 16 through the loop filter 15. The voltage-controlled oscillator 16 adjusts a clock phase to obtain a data element with an optimal sampling phase.

In FIG. 1, the clock phase extraction unit may be disposed at different positions.

In an implementation, a clock phase extraction unit 171 may be disposed at an output end of the dispersion compensation unit 12. Before a signal enters the clock phase extraction unit 171, a polarization state rotation of the signal is tracked and compensated by using a polarization rotation tracking module. In this implementation, the analog-to-digital converter 11, the dispersion compensation unit 12, the polarization rotation tracking module 172, the clock phase extraction unit 171, the loop filter 15, and the voltage-controlled oscillator 16 form a feedback loop, to complete adjustment of a sampling clock of the analog-to-digital converter 11. However, there are many modules in the feedback loop, and the dispersion compensation unit 12 needs to perform FFT and IFFT, resulting in a relatively long period of data processing time. Therefore, a clock recovery delay is very high, and system performance is affected. In addition, the polarization rotation tracking module 172 is difficult to be implemented in a scenario with great channel impairment. This reduces an impairment compensation effect of the polarization state rotation.

In another implementation, a clock phase extraction unit 181 may be disposed at an output end of the polarization state compensation circuit 13. In this implementation, the analog-to-digital converter 11, the dispersion compensation unit 12, the polarization state compensation circuit 13, the clock phase extraction unit 181, the loop filter 15, and the voltage-controlled oscillator 16 form a feedback loop, to complete adjustment of the sampling clock of the analog-to-digital converter 11. There are many modules in the feedback loop, and the clock recovery delay is very high. In addition, a quantity of clock phases compensated by the polarization state compensation circuit 13 is the same as a quantity of phases that can be detected by the clock phase extraction unit 181. This usually results in a large signal phase offset and a large detection deviation, and reduces sensitivity of clock phase extraction.

In still another implementation, a clock phase extraction unit 191 may be disposed at an output end of the carrier recovery module 14. In this implementation, the analog-to-digital converter 11, the dispersion compensation unit 12, the polarization state compensation circuit 13, the carrier recovery module 14, the clock phase extraction unit 191, the loop filter 15, and the voltage-controlled oscillator 16 form a feedback loop, to complete adjustment of the sampling clock of the analog-to-digital converter 11. There are more modules in the feedback loop, and the clock recovery delay is higher.

It can be learned that in a clock phase recovery process, there are many modules in an entire loop of the existing clock phase recovery apparatus. This results in a very high clock recovery delay and affects the system performance.

To resolve the foregoing technical problem, embodiments of this application provide a clock phase recovery apparatus and method, and a chip. In the clock phase recovery process, a quantity of modules in the feedback loop is reduced to reduce a loop delay. This reduces a clock phase delay and improves the system performance.

The following describes in detail, by using specific embodiments, technical solutions of this application and how to resolve the foregoing technical problem by using the technical solutions of this application. The following specific embodiments may be combined with one another. Same or similar concepts or processes may not be described in detail in some embodiments.

Figure 2:
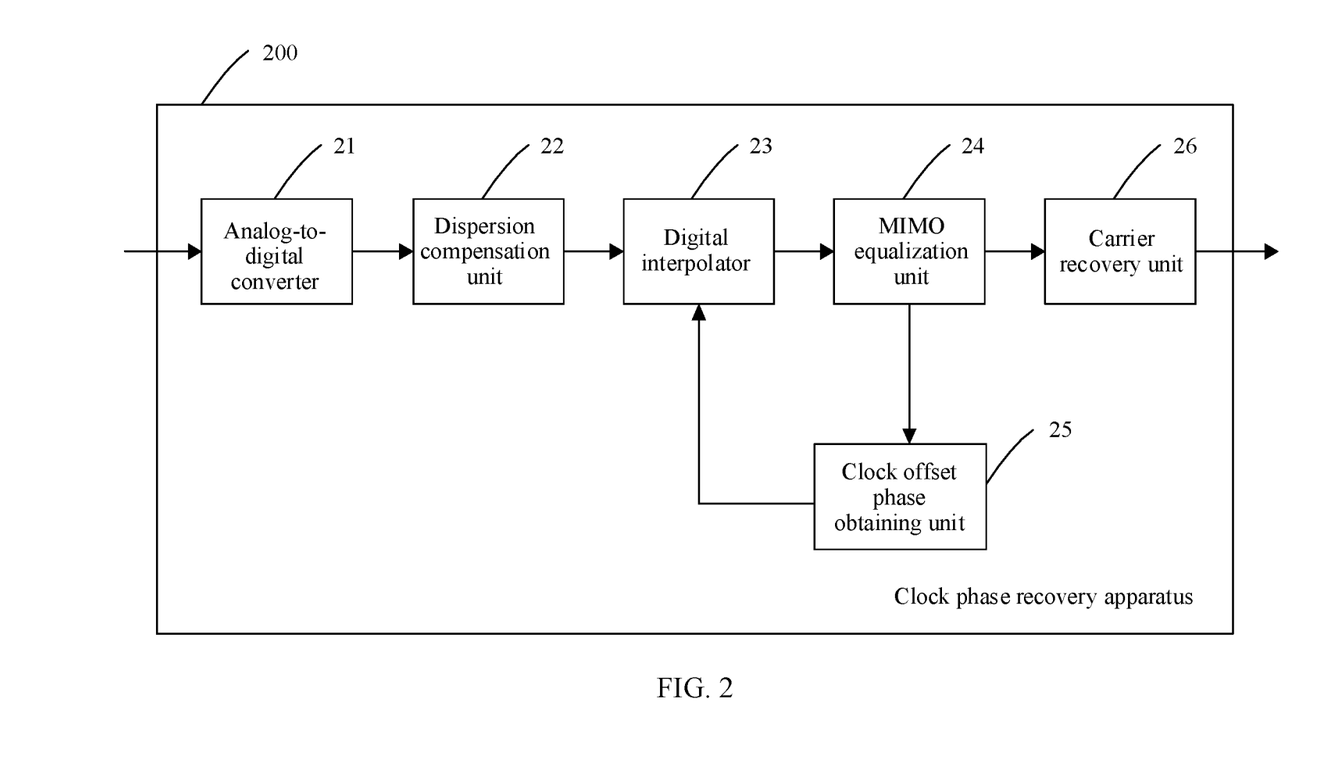
FIG. 2 is a schematic structural diagram of a clock phase recovery apparatus according to Embodiment 1 of this application.

FIG. 2 is a schematic structural diagram of a clock phase recovery apparatus according to Embodiment 1 of this application. As shown in FIG. 2, a clock phase recovery apparatus 200 provided in this embodiment may include:

an analog-to-digital converter (ADC) 21, a dispersion compensation unit 22 (which may be denoted as CD EQ), a digital interpolator 23 (which may be denoted as Int.), a multiple-input multiple-output (MIMO) equalization unit 24 (which may be denoted as MIMO EQ), and a clock offset phase obtaining unit 25.

An output end of the analog-to-digital converter 21 is connected to an input end of the dispersion compensation unit 22, and an output end of the dispersion compensation unit 22 is connected to a first input end of the digital interpolator 23. An output end of the digital interpolator 23 is connected to an input end of the MIMO equalization unit 24, and an output end of the MIMO equalization unit 24 is connected to an input end of the clock offset phase obtaining unit 25. An output end of the clock offset phase obtaining unit 25 is connected to a second input end of the digital interpolator 23.

The analog-to-digital converter 21 is configured to perform analog-to-digital conversion on an input analog signal, and output a second sampling signal.

The dispersion compensation unit 22 is configured to perform dispersion compensation on the second sampling signal output by the analog-to-digital converter 21, and output a dispersion-compensated signal to the digital interpolator 23.

The digital interpolator 23 is configured to adjust, based on first offset phase information output by the clock offset phase obtaining unit 25, the dispersion-compensated signal output by the dispersion compensation unit 22, so that a signal output by the digital interpolator 23 is a signal at an optimal sampling moment. The first offset phase information is determined by the clock offset phase obtaining unit 25 based on a tap coefficient of the MIMO equalization unit 24 and a first output signal output by the MIMO equalization unit 24. The first output signal is an output signal corresponding to a first sampling signal, and the first sampling signal is a previous adjacent sampling signal of the second sampling signal.

The MIMO equalization unit 24 is configured to perform polarization mode dispersion compensation and equalization on the signal output by the digital interpolator 23, and output a second output signal.

In this embodiment, a principle of clock phase recovery is as follows.

The analog-to-digital converter 21 samples the input analog signal, and outputs a sampling signal. According to an output sequence of the sampling signal, two adjacent sampling signals may be respectively referred to as a first sampling signal and a second sampling signal. In other words, the first sampling signal is a previous adjacent sampling signal of the second sampling signal.

After the first sampling signal is processed by the dispersion compensation unit 22, the digital interpolator 23, and the MIMO equalization unit 24, the MIMO equalization unit 24 outputs the first output signal corresponding to the first sampling signal. The clock offset phase obtaining unit 25 determines the first offset phase information based on the first output signal and the tap coefficient of the MIMO equalization unit 24, and feeds back the first offset phase information to the second input end of the digital interpolator 23. The first offset phase information is used by the digital interpolator 23 to adjust a dispersion-compensated signal corresponding to the second sampling signal.

For the second sampling signal, after the second sampling signal is input at the input end of the dispersion compensation unit 22, the dispersion compensation unit 22 performs the dispersion compensation on the second sampling signal, and outputs the dispersion-compensated signal to the digital interpolator 23.

The digital interpolator 23 has two input ends, which may be respectively referred to as the first input end and the second input end. The dispersion-compensated signal is input at the first input end of the digital interpolator 23, and the first offset phase information fed back by the clock offset phase obtaining unit 25 is input at the second input end of the digital interpolator 23. The digital interpolator 23 adjusts, based on the first offset phase information, the dispersion-compensated signal corresponding to the second sampling signal, so that the signal output by the digital interpolator 23 is the signal at the optimal sampling moment.

A basic principle of the digital interpolator is as follows: When sampling frequency or a phase of the sampling signal is not ideal, for example, when the sampling frequency becomes higher or lower than reference frequency, or when a sampling location is not at an optimal point of an element waveform, the sampling signal may be adjusted by using an interpolation method to obtain an optimal sampling signal. In this embodiment, the digital interpolator 23 adjusts, based on offset phase information fed back by the clock offset phase obtaining unit 25, a signal output by the dispersion compensation unit 22.

The signal output by the digital interpolator 23 is input at the input end of the MIMO equalization unit 24. The MIMO equalization unit 24 performs the polarization mode dispersion compensation and equalization on the signal output by the digital interpolator 23, and outputs the second output signal corresponding to the second sampling signal.

The second output signal is input at the input end of the clock offset phase obtaining unit 25. The clock offset phase obtaining unit 25 determines second offset phase information based on the second output signal and the tap coefficient of the MIMO equalization unit 24, and feeds back the second offset phase information to the second input end of the digital interpolator 23. The second offset phase information is used by the digital interpolator 23 to adjust a dispersion-compensated signal corresponding to a third sampling signal. The third sampling signal is output by the analog-to-digital converter 21 and is a next adjacent sampling signal of the second sampling signal.

It can be learned that, compared with the clock phase recovery apparatus shown in FIG. 1, in the clock phase recovery apparatus provided in this embodiment, the digital interpolator is disposed between the dispersion compensation unit and the MIMO equalization unit. The digital interpolator, the MIMO equalization unit, and the clock offset phase obtaining unit form a feedback loop to complete a clock phase adjustment. There is a small quantity of modules in the feedback loop, and in particular, the dispersion compensation unit is not included. Therefore, a delay caused by FFT and IFFT calculation is avoided, and a loop delay is reduced. This reduces a clock phase delay and improves system performance. In addition, because an adjustment speed of the digital interpolator is relatively fast, the clock phase delay is further reduced.

In addition, compared with the first disposing position of the clock phase extraction unit in FIG. 1, in this embodiment, polarization mode dispersion compensation and equalization are performed on a signal by using the MIMO equalization unit. This reduces damage impact on the signal caused by polarization state rotation and improves a compensation effect. Compared with the second disposing position of the clock phase extraction unit in FIG. 1, in this embodiment, the clock offset phase obtaining unit determines offset phase information based on an output signal from the MIMO equalization unit and the tap coefficient of the MIMO equalization unit. This improves sensitivity and accuracy of clock phase extraction. Compared with the third disposing position of the clock phase extraction unit in FIG. 1, in this embodiment, there is a small quantity of modules in the feedback loop. This reduces the clock phase delay and improves the system performance.

It should be noted that, in this embodiment, the analog-to-digital converter 21 is configured to perform the analog-to-digital conversion on the analog signal, the dispersion compensation unit 22 is configured to perform the dispersion compensation, and the MIMO equalization unit 24 is configured to perform the polarization mode dispersion compensation and equalization. The digital interpolator 23 may be implemented by using any existing circuit, chip, unit, module, or device that implements a corresponding function. This is not limited in this embodiment.

Optionally, the clock phase recovery apparatus 200 provided in this embodiment may further include a carrier recovery unit 26 (which may be denoted as CR).

An input end of the carrier recovery unit 26 is connected to the output end of the MIMO equalization unit 24.

The carrier recovery unit 26 is configured to perform carrier recovery on the output signal output by the MIMO equalization unit 24, and output a carrier-recovered signal.

Specifically, after the first sampling signal is processed by the dispersion compensation unit 22, the digital interpolator 23, and the MIMO equalization unit 24, the MIMO equalization unit 24 outputs the first output signal corresponding to the first sampling signal. The carrier recovery unit 26 is configured to perform carrier recovery on the first output signal output by the MIMO equalization unit 24, and output a carrier-recovered signal. After the second sampling signal is processed by the dispersion compensation unit 22, the digital interpolator 23, and the MIMO equalization unit 24, the MIMO equalization unit 24 outputs the second output signal corresponding to the second sampling signal. The carrier recovery unit 26 is configured to perform carrier recovery on the second output signal output by the MIMO equalization unit 24, and output a carrier-recovered signal.

It should be noted that, in this embodiment, the carrier recovery unit 26 is configured to perform the carrier recovery, and may be implemented by using any existing circuit, chip, unit, module, or device that implements a corresponding function. This is not limited in this embodiment.

This embodiment provides the clock phase recovery apparatus, and the clock phase recovery apparatus includes the analog-to-digital converter, the dispersion compensation unit, the digital interpolator, the MIMO equalization unit, and the clock offset phase obtaining unit. The digital interpolator, the MIMO equalization unit, and the clock offset phase obtaining unit form the feedback loop to complete the clock phase adjustment. There is a small quantity of modules in the feedback loop. Therefore, this reduces the clock phase delay and improves the system performance.

Figure 3:
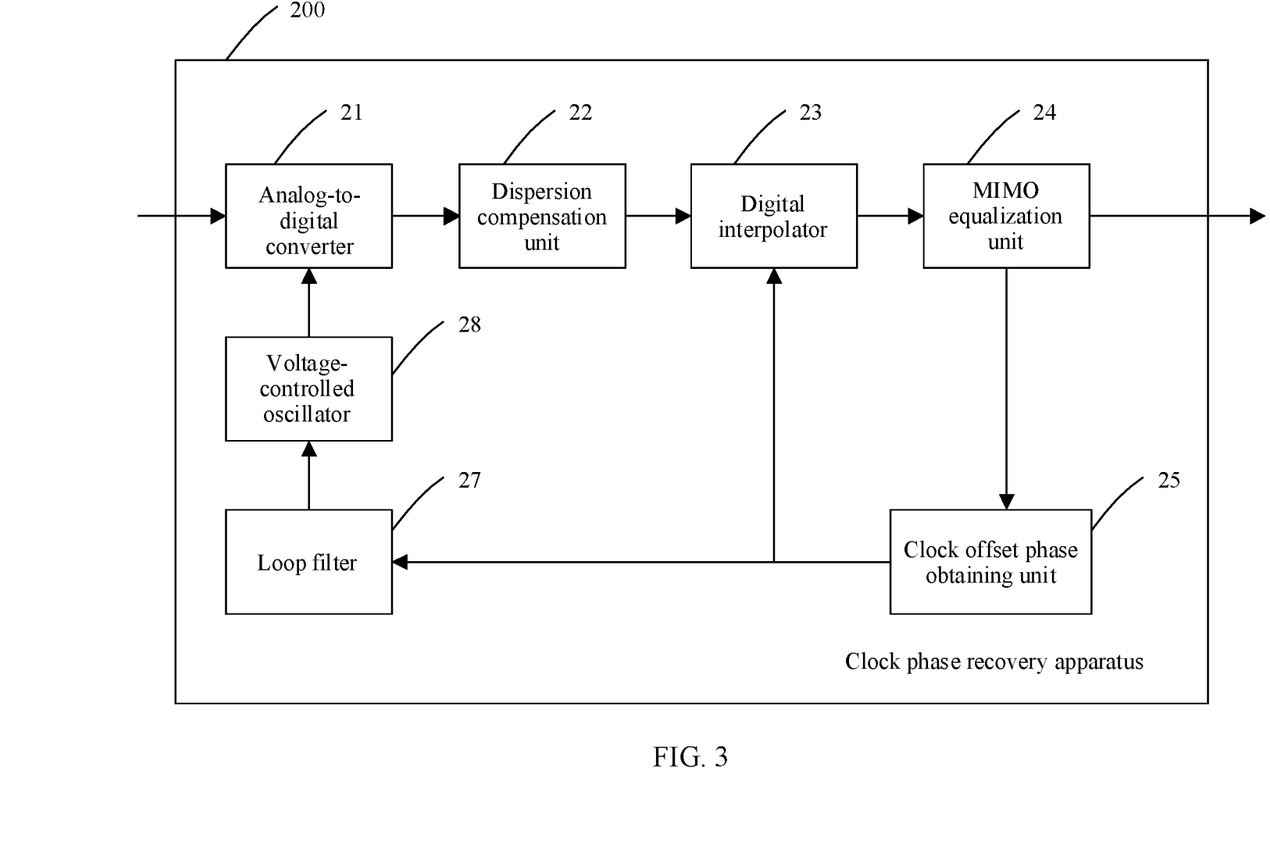
FIG. 3 is a schematic structural diagram of a clock phase recovery apparatus according to Embodiment 2 of this application.

FIG. 3 is a schematic structural diagram of a clock phase recovery apparatus according to Embodiment 2 of this application. Based on the embodiment shown in FIG. 2, this embodiment provides another implementation of the clock phase recovery apparatus. As shown in FIG. 3, the clock phase recovery apparatus 200 provided in this embodiment may include the analog-to-digital converter 21, the dispersion compensation unit 22, the digital interpolator 23, the MIMO equalization unit 24, and the clock offset phase obtaining unit 25.

The clock phase recovery apparatus 200 may further include a voltage-controlled oscillator (VCO) 28 and a loop filter 27.

The output end of the clock offset phase obtaining unit 25 is further connected to an input end of the loop filter 27, an output end of the loop filter 27 is connected to an input end of the voltage-controlled oscillator 28, and an output end of the voltage-controlled oscillator 28 is connected to the analog-to-digital converter 21.

The loop filter 27 is configured to perform loop low-pass filtering on the first offset phase information output by the clock offset phase obtaining unit 25 to convert the first offset phase information into a voltage control signal.

The voltage-controlled oscillator 28 is configured to determine a clock adjustment signal based on the voltage control signal output by the loop filter 27.

Specifically, the digital interpolator 23, the MIMO equalization unit 24, and the clock offset phase obtaining unit 25 form a inner feedback loop (or referred to as a digital interpolator path), to complete adjustment of a clock phase. The clock offset phase obtaining unit 25, the voltage-controlled oscillator 28, and the loop filter 27 form a outer feedback loop (or referred to as a voltage-controlled oscillator adjustment path), and sampling frequency of the analog-to-digital converter 21 may be adjusted by adjusting the voltage-controlled oscillator 28. In this way, a signal that is input into the inner feedback loop is a signal with adjusted sampling frequency. Therefore, accuracy and an effect of clock phase recovery are further improved. For the digital interpolator 23, the voltage-controlled oscillator adjustment path is a path with a relatively low adjustment speed. A delay of an entire loop still depends on the digital interpolator 23. Therefore, compared with the prior art, the clock phase recovery apparatus provided in this embodiment can reduce a clock phase delay is reduced, and improve system performance.

It should be noted that the loop filter 27 and the voltage-controlled oscillator 28 in this embodiment may be implemented by using any existing circuit, chip, unit, module, or device that implements a corresponding function. This is not limited in this embodiment.

Optionally, the analog-to-digital converter 21 is specifically configured to:

adjust the sampling frequency based on the clock adjustment signal output by the voltage-controlled oscillator 28; and perform the analog-to-digital conversion on the analog signal based on adjusted sampling frequency to obtain the second sampling signal.

This embodiment provides the clock phase recovery apparatus, and the clock phase recovery apparatus includes the analog-to-digital converter, the dispersion compensation unit, the digital interpolator, the MIMO equalization unit, the clock offset phase obtaining unit, the voltage-controlled oscillator, and the loop filter. The digital interpolator, the MIMO equalization unit, and the clock offset phase obtaining unit form the feedback loop to complete the clock phase adjustment. There is a small quantity of modules in the feedback loop. Therefore, this reduces the clock phase delay and improves the system performance. In addition, the sampling frequency of the analog-to-digital converter is adjusted by using the voltage-controlled oscillator and the loop filter. This further improves accuracy of clock phase recovery.

Figure 4:
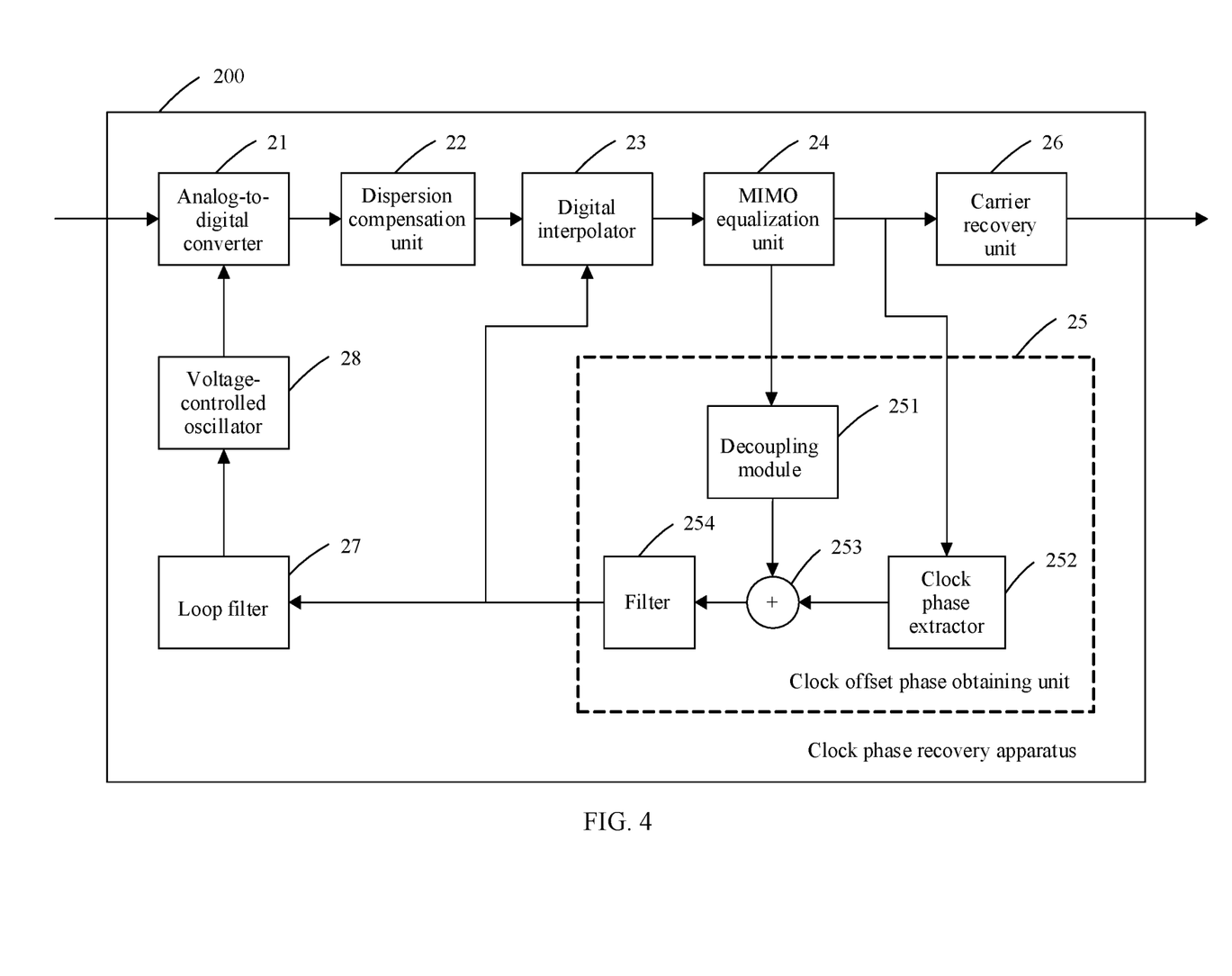
FIG. 4 is a schematic structural diagram of a clock phase recovery apparatus according to Embodiment 3 of this application.

FIG. 4 is a schematic structural diagram of a clock phase recovery apparatus according to Embodiment 3 of this application. Based on the embodiments shown in FIG. 2 and FIG. 3, this embodiment provides a specific implementation of the clock phase recovery apparatus, and in particular, provides a specific implementation of a clock offset phase obtaining unit. As shown in FIG. 4, the clock phase recovery apparatus 200 provided in this embodiment may include the analog-to-digital converter 21, the dispersion compensation unit 22, the digital interpolator 23, the MIMO equalization unit 24, and the clock offset phase obtaining unit 25.

The clock offset phase obtaining unit 25 may include a decoupling module 251 (which may be denoted as Uncoupling), a clock phase detector 252 (which may be denoted as Phase Det.), an adder 253, and a filter 254 (which may be denoted as a Loop Filter).

A first output end of the MIMO equalization unit 24 is connected to an input end of the decoupling module 251, and a second output end of the MIMO equalization unit 24 is connected to an input end of the clock phase detector 252. The output end of the MIMO equalization unit 24 and an output end of the clock phase detector 252 are separately connected to an input end of the adder 253. An output end of the adder 253 is connected to an input end of the filter 254, and an output end of the filter 254 is connected to the second input end of the digital interpolator 23.

The decoupling module 251 is configured to determine a compensated clock phase based on the tap coefficient of the MIMO equalization unit 24, and output the compensated clock phase to the adder 253.

The clock phase detector 252 is configured to obtain a clock phase of the first output signal output by the MIMO equalization unit 24, and output the clock phase of the first output signal to the adder 253.

The adder 253 is configured to obtain a clock offset phase based on the compensated clock phase output by the decoupling module 251 and the clock phase that is of the first output signal and that is output by the clock phase detector 252, and output the clock offset phase to the filter 254.

The filter 254 is configured to perform high frequency filtering on the clock offset phase output by the adder 253 to obtain the first offset phase information, and output the first offset phase information to the digital interpolator 23.

In this embodiment, a principle of clock phase recovery is as follows.

The analog-to-digital converter 21 samples the input analog signal. According to an output sequence of a sampling signal, two adjacent sampling signals may be respectively referred to as a first sampling signal and a second sampling signal.

After the first sampling signal is processed by the dispersion compensation unit 22, the digital interpolator 23, and the MIMO equalization unit 24, the MIMO equalization unit 24 outputs the first output signal corresponding to the first sampling signal.

The decoupling module 251 determines the compensated clock phase based on the tap coefficient of the MIMO equalization unit 24. The clock phase detector 252 obtains the clock phase of the first output signal. The adder 253 obtains an accurate first clock offset phase based on the input compensated clock phase and the clock phase of the first output signal. The filter 254 performs high frequency filtering on the accurate clock offset phase to further improve accuracy of filtered first offset phase information. The filter 254 feeds back the first offset phase information to the second input end of the digital interpolator 23. The first offset phase information is used by the digital interpolator 23 to adjust the dispersion-compensated signal corresponding to the second sampling signal.

After the second sampling signal is processed by the dispersion compensation unit 22, the dispersion compensation unit 22 outputs the dispersion-compensated signal to the digital interpolator 23. The digital interpolator 23 adjusts, based on the first offset phase information, the dispersion-compensated signal corresponding to the second sampling signal, so that the signal output by the digital interpolator 23 is the signal at the optimal sampling moment. Then, the MIMO equalization unit 24 performs polarization mode dispersion compensation and equalization on the signal output by the digital interpolator 23, and outputs the second output signal corresponding to the second sampling signal. The decoupling module 251, the clock phase detector 252, the adder 253, and the filter 254 perform the foregoing processing on the second output signal to obtain the second offset phase information, and the second offset phase information is fed back to the second input end of the digital interpolator 23. The second offset phase information is used by the digital interpolator 23 to adjust the dispersion-compensated signal corresponding to the third sampling signal. The third sampling signal is output by the analog-to-digital converter 21 and is the next adjacent sampling signal of the second sampling signal.

Descriptions are provided in the following by using specific examples.

The MIMO equalization unit 24 performs specific compensation on clock offset of a signal. For example, an original phase change speed of the signal is A, and a phase change speed a is compensated by the MIMO equalization unit 24 for the phase change speed A. In this way, an output phase change speed of the signal is A−a. In this embodiment, the decoupling module 251 determines a compensated clock phase a of the MIMO equalization unit 24 based on the tap coefficient of the MIMO equalization unit 24. The clock phase detector 252 obtains the clock phase A−a of the first output signal output by the MIMO equalization unit 24. The adder 253 converts the clock phase A−a of the first output signal into an angle, and adds the angle to the compensated clock phase a, to obtain accurate first offset phase information (A−a)+a=A.

It can be learned that, in the clock phase recovery apparatus provided in this embodiment, the digital interpolator, the MIMO equalization unit, the decoupling module, the clock phase detector, the adder, and the filter form a feedback loop (or referred to as a digital interpolator path), to complete a clock phase adjustment. There is a small quantity of modules in the feedback loop, and a loop delay is reduced. Therefore, this reduces a clock phase delay and improves system performance. In addition, an adjustment speed of the digital interpolator is relatively fast, and there is only one filter in the digital interpolator path. Therefore, this further reduces the clock phase delay. By using the decoupling module and the clock phase detector, accuracy of a clock phase deviation is improved. Therefore, accuracy of the clock phase recovery is improved.

It should be noted that, in this embodiment, the decoupling module 251 is configured to determine a quantity of clock phases compensated by the MIMO equalization unit 24, and the clock phase detector 252 is configured to extract a clock phase of a signal. The adder 253 and the filter 254 may be implemented by using any existing circuit, chip, unit, module, or device that implements a corresponding function. This is not limited in this embodiment.

Optionally, the clock phase detector 252 may be a phase detector.

Optionally, the decoupling module 251 may be specifically configured to:

determine the compensated clock phase a according to a=angle ($W_{xx}*W_{yy}-W_{yx}*W_{xy}$).

$W_{xx}$, $W_{yy}$, $W_{yx}$, and $W_{xy}$ are tap coefficients of the MIMO equalization unit 24, and angle ( ) represents a phase function.

Specifically, the MIMO equalization unit 24 may have two input ends and two output ends. A signal in a polarization state may be separately input at the two input ends. Correspondingly, a signal in a polarization state may be separately output at the two output ends. In this case, the MIMO equalization unit 24 has the four tap coefficients: Wxx, Wyy, Wyx, and Wxy; and x and y may represent different polarization states, or are used to distinguish different inputs and outputs. The compensated clock phase a may be determined according to a formula: a=angle (Wxx*Wyy−Wyx*Wxy).

It should be noted that this embodiment provides an implementation in which a clock phase compensated by the MIMO equalization unit 24 is determined based on the tap coefficient of the MIMO equalization unit 24 when the MIMO equalization unit 24 has the two input ends and the two output ends. When a quantity of tap coefficients of the MIMO equalization unit 24 is different, there may be another implementation. This is not limited in this embodiment.

Optionally, the clock phase recovery apparatus 200 provided in this embodiment may further include the carrier recovery unit 26. The input end of the carrier recovery unit 26 is connected to the output end of the MIMO equalization unit 24.

The carrier recovery unit 26 is configured to perform carrier recovery on an output signal output by the MIMO equalization unit 24, and output a carrier-recovered signal.

Optionally, the clock phase recovery apparatus 200 provided in this embodiment may further include the voltage-controlled oscillator 28 and the loop filter 27.

The output end of the clock offset phase obtaining unit 25 is further connected to the input end of the loop filter 27, the output end of the loop filter 27 is connected to the input end of the voltage-controlled oscillator 28, and the output end of the voltage-controlled oscillator 28 is connected to the analog-to-digital converter 21.

The loop filter 27 is configured to perform the loop low-pass filtering on the first offset phase information output by the clock offset phase obtaining unit 25 to convert the first offset phase information into the voltage control signal.

The voltage-controlled oscillator 28 is configured to determine the clock adjustment signal based on the voltage control signal output by the loop filter 27.

Optionally, the analog-to-digital converter 21 is specifically configured to:

adjust the sampling frequency based on the clock adjustment signal output by the voltage-controlled oscillator 28; and perform the analog-to-digital conversion on the analog signal based on the adjusted sampling frequency to obtain the second sampling signal.

This embodiment provides the clock phase recovery apparatus, and the clock phase recovery apparatus includes the analog-to-digital converter, the dispersion compensation unit, the digital interpolator, the MIMO equalization unit, and the clock offset phase obtaining unit. The clock offset phase obtaining unit includes the decoupling module, the clock phase detector, the adder, and the filter. The digital interpolator, the MIMO equalizing unit, the decoupling module, the clock phase detector, the adder and the filter form the feedback loop to implement the clock phase adjustment. There is a small quantity of modules in the feedback loop. Therefore, this reduces the clock phase delay and improves the system performance.

Figure 5:
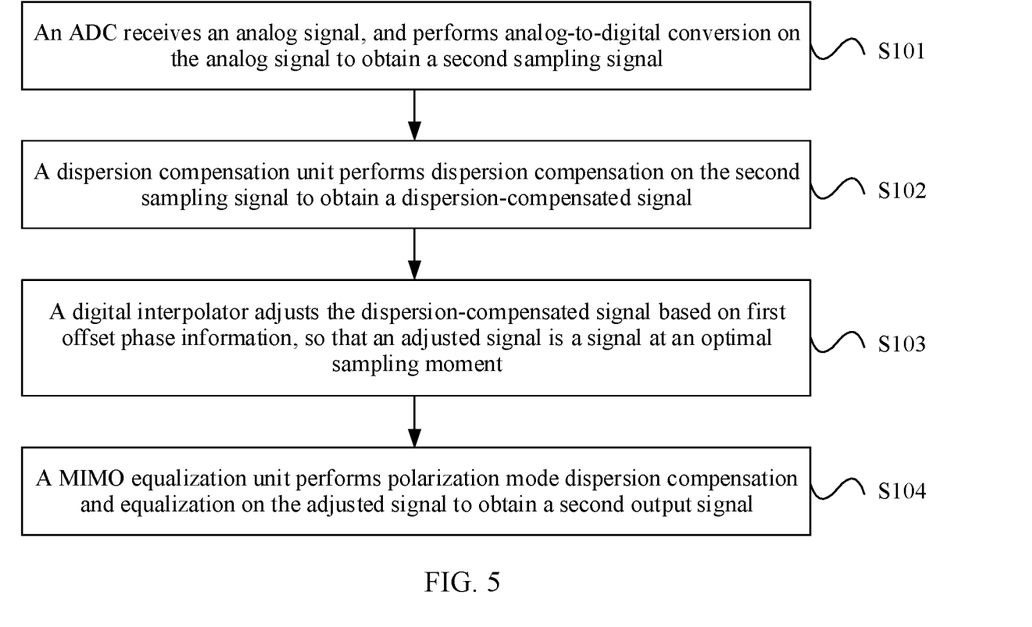
FIG. 5 is a schematic flowchart of a clock phase recovery method according to Embodiment 1 of this application.

FIG. 5 is a schematic flowchart of a clock phase recovery method according to Embodiment 1 of this application. As shown in FIG. 5, the clock phase recovery method provided in this embodiment may be applied to a clock phase recovery apparatus. The clock phase recovery apparatus includes an ADC, a dispersion compensation unit, a digital interpolator, a MIMO equalization unit, and a clock offset phase obtaining unit.

An output end of the ADC is connected to an input end of the dispersion compensation unit, and an output end of the dispersion compensation unit is connected to a first input end of the digital interpolator. An output end of the digital interpolator is connected to an input end of the MIMO equalization unit, and an output end of the MIMO equalization unit is connected to an input end of the clock offset phase obtaining unit. An output end of the clock offset phase obtaining unit is connected to a second input end of the digital interpolator.

The clock phase recovery method provided in this embodiment may include the following steps.

S101: The ADC receives an analog signal, and performs analog-to-digital conversion on the analog signal to obtain a second sampling signal.

S102: The dispersion compensation unit performs dispersion compensation on the second sampling signal to obtain a dispersion-compensated signal.

S103: The digital interpolator adjusts the dispersion-compensated signal based on first offset phase information, so that an adjusted signal is a signal at an optimal sampling moment.

The first offset phase information is determined by the clock offset phase obtaining unit based on a tap coefficient of the MIMO equalization unit and a first output signal. The first output signal is an output signal corresponding to a first sampling signal, and the first sampling signal is a previous adjacent sampling signal of the second sampling signal.

S104: The MIMO equalization unit performs polarization mode dispersion compensation and equalization on the adjusted signal to obtain a second output signal.

Optionally, the clock offset phase obtaining unit includes a decoupling module, a clock phase detector, an adder, and a filter.

A first output end of the MIMO equalization unit is connected to an input end of the decoupling module, and a second output end of the MIMO equalization unit is connected to an input end of the clock phase detector. The output end of the MIMO equalization unit and an output end of the clock phase detector are separately connected to an input end of the adder. An output end of the adder is connected to an input end of the filter, and an output end of the filter is connected to the second input end of the digital interpolator.

That the clock offset phase obtaining unit determines the first offset phase information based on the tap coefficient of the MIMO equalization unit and the first output signal may include: determining, by the decoupling module, a compensated clock phase based on the tap coefficient of the MIMO equalization unit;

obtaining, by the clock phase detector, a clock phase of the first output signal;

obtaining, by the adder, a clock offset phase based on the compensated clock phase and the clock phase of the first output signal; and performing, by the filter, high frequency filtering on the clock offset phase to obtain the first offset phase information.

Optionally, the determining, by the decoupling module, a compensated clock phase based on the tap coefficient of the MIMO equalization unit may include:

determining, by the decoupling module, the compensated clock phase a according to a=angle (Wxx*Wyy−

Wyx*Wxy), where Wxx, Wyy, Wyx, and Wxy are tap coefficients of the MIMO equalization unit, and angle ( ) represents a phase function.

Optionally, the clock phase recovery apparatus may further include a carrier recovery unit, and an input end of the carrier recovery unit is connected to the output end of the MIMO equalization unit.

The clock phase recovery method provided in this embodiment may further include:

performing, by the carrier recovery unit, carrier recovery on the second output signal to obtain a carrier-recovered signal.

Optionally, the clock phase recovery apparatus may further include a VCO and a loop filter.

The output end of the clock offset phase obtaining unit is further connected to an input end of the loop filter, an output end of the loop filter is connected to an input end of the VCO, and an output end of the VCO is connected to the ADC.

The clock phase recovery method provided in this embodiment may further include:

performing, by the loop filter, loop low-pass filtering on the first offset phase information to convert the first offset phase information into a voltage control signal; and determining, by the VCO, a clock adjustment signal based on the voltage control signal.

Optionally, that the ADC performs the analog-to-digital conversion on the analog signal to obtain the second sampling signal may include:

adjusting, by the ADC, sampling frequency based on the clock adjustment signal; and performing, by the ADC, the analog-to-digital conversion on the analog signal based on adjusted sampling frequency to obtain the second sampling signal.

The clock phase recovery method provided in this embodiment of this application may be applied to the clock phase recovery apparatus provided in the embodiments shown in FIG. 2 to FIG. 4. Technical principles and technical effects thereof are similar, and details are not described herein again.

An embodiment of this application further provides a chip, including the clock phase recovery apparatus provided in the apparatus embodiments of this application.

The chip provided in this embodiment of this application includes the clock phase recovery apparatus provided in the embodiments shown in FIG. 2 to FIG. 4. Technical principles and technical effects thereof are similar, and details are not described herein again.

What is claimed is:

1. A clock phase recovery apparatus, comprising an analog-to-digital converter (ADC), a dispersion compensation unit, a digital interpolator, a multiple-input multiple-output (MIMO) equalization unit, and a clock offset phase obtaining unit, wherein an output end of the ADC is connected to an input end of the dispersion compensation unit, an output end of the dispersion compensation unit is connected to a first input end of the digital interpolator, an output end of the digital interpolator is connected to an input end of the MIMO equalization unit, an output end of the MIMO equalization unit is connected to an input end of the clock offset phase obtaining unit, and an output end of the clock offset phase obtaining unit is connected to a second input end of the digital interpolator;

the ADC is configured to perform analog-to-digital conversion on an input analog signal, and output a second sampling signal;

the dispersion compensation unit is configured to perform dispersion compensation on the second sampling signal output by the ADC, and output a dispersion-compensated signal to the digital interpolator;

the digital interpolator is configured to adjust, based on first offset phase information output by the clock offset phase obtaining unit, the dispersion-compensated signal output by the dispersion compensation unit, so that a signal output by the digital interpolator is a signal at an optimal sampling moment, wherein the first offset phase information is determined by the clock offset phase obtaining unit based on a tap coefficient of the MIMO equalization unit and a first output signal output by the MIMO equalization unit, the first output signal is an output signal corresponding to a first sampling signal, and the first sampling signal is a previous adjacent sampling signal of the second sampling signal;

the MIMO equalization unit is configured to perform polarization mode dispersion compensation and equalization on the signal output by the digital interpolator, and output a second output signal;

the clock phase recovery apparatus further comprising a carrier recovery unit, wherein an input end of the carrier recovery unit is connected to the output end of the MIMO equalization unit; and the carrier recovery unit is configured to perform carrier recovery on the second output signal output by the MIMO equalization unit, and output a carrier-recovered signal.

2. The apparatus according to claim 1, wherein the clock offset phase obtaining unit comprises a decoupling module, a clock phase detector, an adder, and a filter, wherein a first output end of the MIMO equalization unit is connected to an input end of the decoupling module, a second output end of the MIMO equalization unit is connected to an input end of the clock phase detector, the output end of the MIMO equalization unit and an output end of the clock phase detector are separately connected to an input end of the adder, an output end of the adder is connected to an input end of the filter, and an output end of the filter is connected to the second input end of the digital interpolator;

the decoupling module is configured to determine a compensated clock phase based on the tap coefficient of the MIMO equalization unit, and output the compensated clock phase to the adder;

the clock phase detector is configured to obtain a clock phase of the first output signal output by the MIMO equalization unit, and output the clock phase of the first output signal to the adder;

the adder is configured to obtain a clock offset phase based on the compensated clock phase output by the decoupling module and the clock phase that is of the first output signal and that is output by the clock phase detector, and output the clock offset phase to the filter; and the filter is configured to perform high frequency filtering on the clock offset phase output by the adder to obtain the first offset phase information, and output the first offset phase information to the digital interpolator.

3. The apparatus according to claim 2, wherein the decoupling module is further configured to:

determine the compensated clock phase a according to:

$$a = \text{angle}(Wxx*Wyy - Wyx*Wxy),$$

wherein Wxx, Wyy, Wyx, and Wxy are tap coefficients of the MIMO equalization unit, and angle ( ) represents a phase function.

4. The apparatus according to claim 2, wherein the clock phase detector is a phase detector.

5. The apparatus according to claim 1, further comprising a voltage-controlled oscillator (VCO) and a loop filter, wherein
the output end of the clock offset phase obtaining unit is further connected to an input end of the loop filter, an output end of the loop filter is connected to an input end of the VCO, and an output end of the VCO is connected to the ADC;
the loop filter is configured to perform loop low-pass filtering on the first offset phase information output by the clock offset phase obtaining unit to convert the first offset phase information into a control voltage signal; and
the VCO is configured to determine a clock adjustment signal based on the voltage control signal output by the loop filter.

6. The apparatus according to claim 5, wherein the ADC is configured to:
adjust a sampling frequency based on the clock adjustment signal output by the VCO; and
perform the analog-to-digital conversion on the analog signal based on the adjusted sampling frequency to obtain the second sampling signal.

7. A clock phase recovery method, applied to a clock phase recovery apparatus, wherein the clock phase recovery apparatus comprises: an analog-to-digital converter (ADC), a dispersion compensation unit, a digital interpolator, a multiple-input multiple-output (MIMO) equalization unit, and a clock offset phase obtaining unit, wherein
an output end of the ADC is connected to an input end of the dispersion compensation unit, an output end of the dispersion compensation unit is connected to a first input end of the digital interpolator, an output end of the digital interpolator is connected to an input end of the MIMO equalization unit, an output end of the MIMO equalization unit is connected to an input end of the clock offset phase obtaining unit, and an output end of the clock offset phase obtaining unit is connected to a second input end of the digital interpolator; and
the method comprises:
receiving, by the ADC, an analog signal, and performing analog-to-digital conversion on the analog signal to obtain a second sampling signal;
performing, by the dispersion compensation unit, dispersion compensation on the second sampling signal to obtain a dispersion-compensated signal;
adjusting, by the digital interpolator, the dispersion-compensated signal based on first offset phase information, so that an adjusted signal is a signal at an optimal sampling moment, wherein the first offset phase information is determined by the clock offset phase obtaining unit based on a tap coefficient of the MIMO equalization unit and a first output signal, the first output signal is an output signal corresponding to a first sampling signal, and the first sampling signal is a previous adjacent sampling signal of the second sampling signal; and
performing, by the MIMO equalization unit, polarization mode dispersion compensation and equalization on the adjusted signal to obtain a second output signal; wherein the clock phase recovery apparatus further comprises a carrier recovery unit, and an input end of the carrier recovery unit is connected to the output end of the MIMO equalization unit; and
the method further comprises:
performing, by the carrier recovery unit, carrier recovery on the second output signal to obtain a carrier-recovered signal.

8. The method according to claim 7, wherein the clock offset phase obtaining unit comprises: a decoupling module, a clock phase detector, an adder, and a filter, wherein
a first output end of the MIMO equalization unit is connected to an input end of the decoupling module, a second output end of the MIMO equalization unit is connected to an input end of the clock phase detector, the output end of the MIMO equalization unit and an output end of the clock phase detector are separately connected to an input end of the adder, an output end of the adder is connected to an input end of the filter, and an output end of the filter is connected to the second input end of the digital interpolator; and
that the clock offset phase obtaining unit determines the first offset phase information based on the tap coefficient of the MIMO equalization unit and the first output signal comprises:
determining, by the decoupling module, a compensated clock phase based on the tap coefficient of the MIMO equalization unit;
obtaining, by the clock phase detector, a clock phase of the first output signal;
obtaining, by the adder, a clock offset phase based on the compensated clock phase and the clock phase of the first output signal; and
performing, by the filter, high frequency filtering on the clock offset phase to obtain the first offset phase information.

9. The method according to claim 8, wherein the determining, by the decoupling module, a compensated clock phase based on the tap coefficient of the MIMO equalization unit comprises:
determining, by the decoupling module, the compensated clock phase a according to:

$$a = \text{angle}(Wxx*Wyy - Wyx*Wxy),$$

wherein Wxx, Wyy, Wyx, and Wxy are tap coefficients of the MIMO equalization unit, and angle ( ) represents a phase function.

10. The method according to claim 7, wherein the clock phase recovery apparatus further comprises: a voltage-controlled oscillator (VCO) and a loop filter, wherein
the output end of the clock offset phase obtaining unit is further connected to an input end of the loop filter, an output end of the loop filter is connected to an input end of the VCO, and an output end of the VCO is connected to the ADC; and
the method further comprises:
performing, by the loop filter, loop low-pass filtering on the first offset phase information to convert the first offset phase information into a voltage control signal; and
determining, by the VCO, a clock adjustment signal based on the voltage control signal.

11. The method according to claim 10, wherein the performing, by the ADC, analog-to-digital conversion on the analog signal to obtain a second sampling signal comprises:
adjusting, by the ADC, a sampling frequency based on the clock adjustment signal; and performing, by the ADC, the analog-to-digital conversion on the analog signal based on the adjusted sampling frequency to obtain the second sampling signal.

12. A clock phase recovery apparatus, comprising an analog-to-digital converter (ADC) and a processor, wherein the ADC is configured to perform analog-to-digital conversion on an input analog, and output a second sampling signal;

the processor is configured to:

perform dispersion compensation on the second sampling signal to obtain a dispersion-compensated signal;

adjust the dispersion-compensated signal based on first offset phase information, so that an adjusted signal is a signal at an optimal sampling moment, wherein the first offset phase information is determined based on a tap coefficient of multiple-input multiple-output (MIMO) equalization and a first output signal, the first output signal is an output signal corresponding to a first sampling signal, and the first sampling signal is a previous adjacent sampling signal of the second sampling signal;

perform polarization mode dispersion compensation and equalization on the adjusted signal to obtain a second output signal;

determine a compensated clock phase based on the tap coefficient of the MIMO equalization;

obtain a clock phase of the first output signal;

obtain a clock offset phase based on the compensated clock phase and the clock phase of the first output signal; and perform high frequency filtering on the clock offset phase to obtain the first offset phase information.

* * * * *